Figure 2:
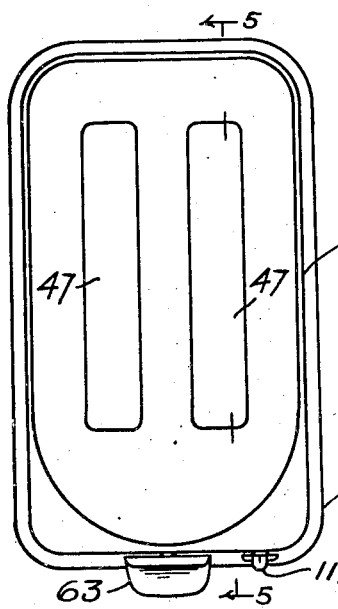

Oct. 7, 1941.  D. J. McCARTHY  2,257,883
AUTOMATIC ELECTRIC TOASTER
Filed Dec. 26, 1939  3 Sheets-Sheet 1

INVENTOR
DANIEL J. McCARTHY
BY
*[signature]*
ATTORNEY

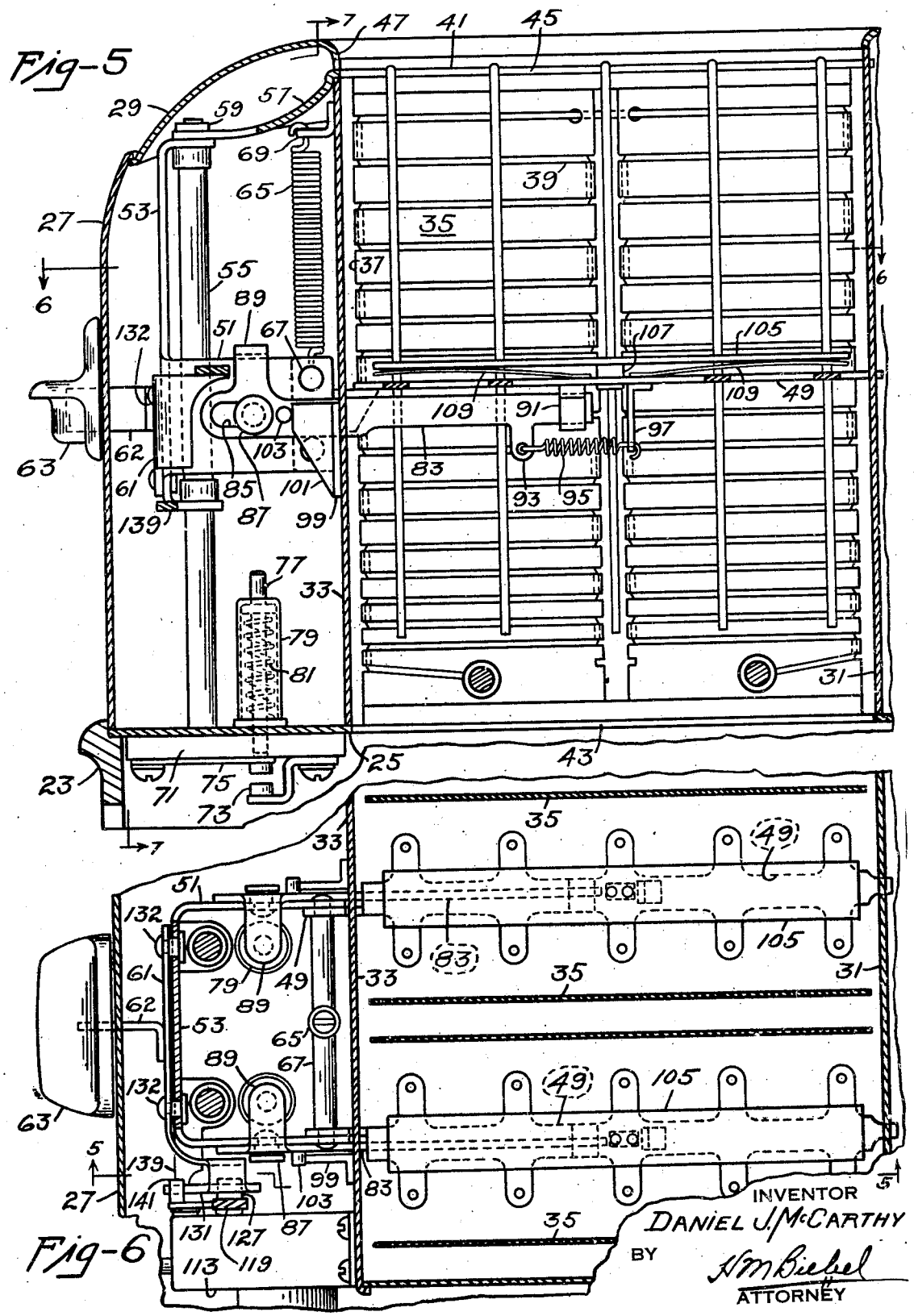

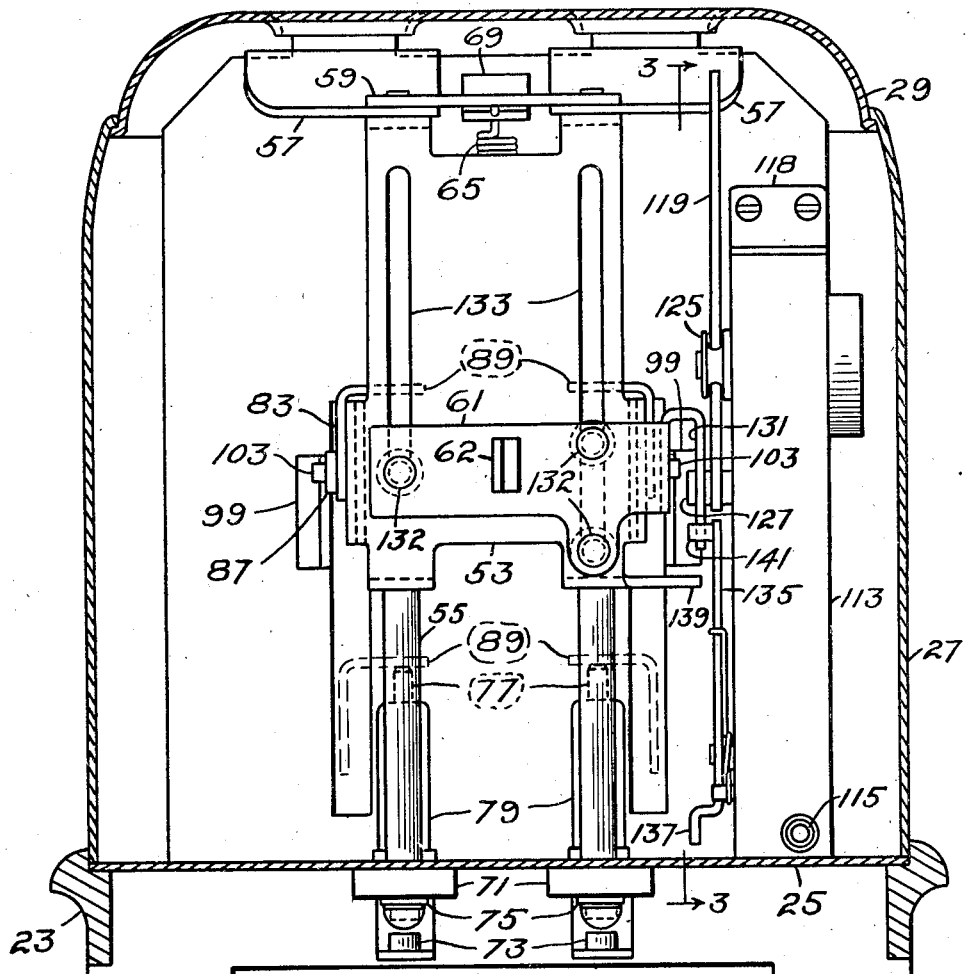
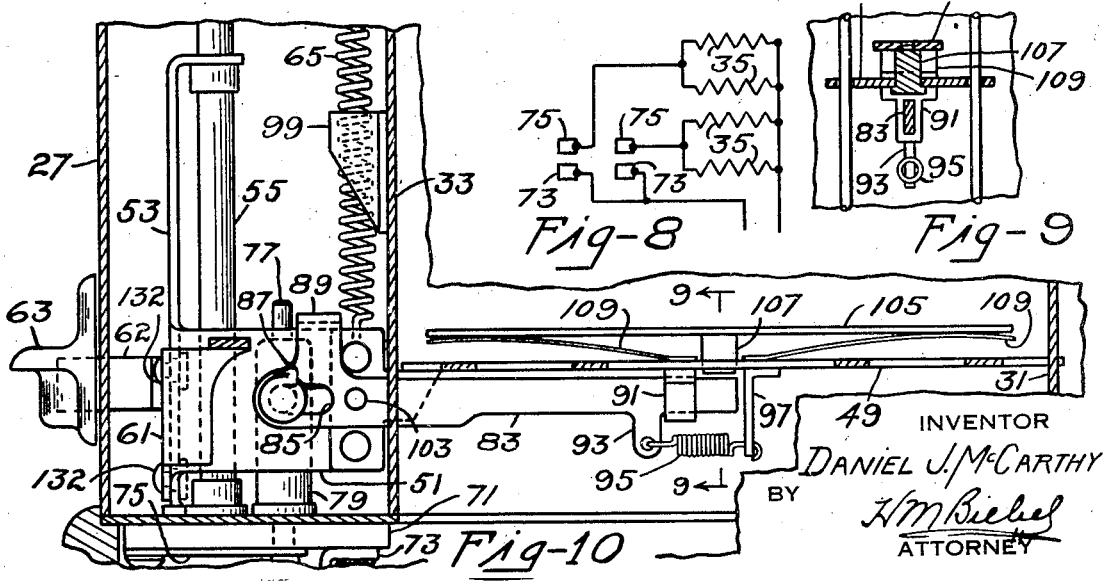

Patented Oct. 7, 1941

2,257,883

UNITED STATES PATENT OFFICE 2,257,883

AUTOMATIC ELECTRIC TOASTER

Daniel J. McCarthy, Elgin, Ill., assignor to Mc-Graw Electric Company, Elgin, Ill., a corporation of Delaware Application December 26, 1939, Serial No. 310,922

4 Claims. (Cl. 219—19)

My invention relates to automatic electric toasters.

An object of my invention is to provide means in an electric toaster to cause the toast heating elements to be energized only in the toasting chambers containing bread slices.

Another object of my invention is to provide means in a multiple-slice toaster, actuable by the weight of a slice of bread for causing energization of selected toast heating elements when the bread carriers are simultaneously moved into toasting position.

Another object of my invention is to provide a multiple-slice toaster with circuit control means for each toasting chamber and effect energization of the toast heating elements of only those toasting chambers into which a slice of bread has been moved.

Another object of my invention is to provide a multiple-slice toaster having means for insuring that the electric energy translated into heat therein is proportional to the number of slices of bread being toasted.

A still further object of my invention is to provide a multiple-slice toaster having means for insuring a saving in the amount of electric energy translated into heat therein when less than the total number of slices of bread which it is possible to toast therein are being toasted.

Other objects of my invention will either be evident from a description of a form of device now preferred by me or will be set forth in the specification and more particularly in the appended claims.

Figure 1:
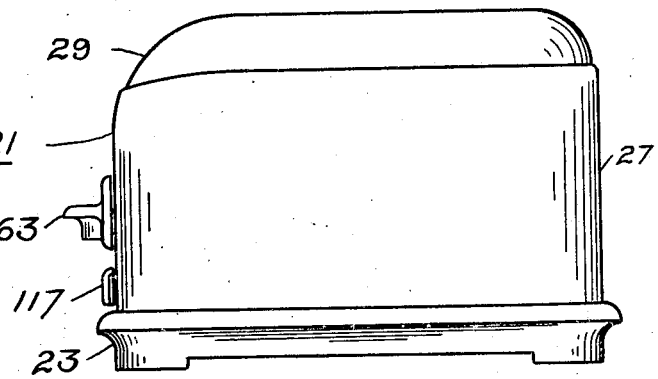
Figure 3:
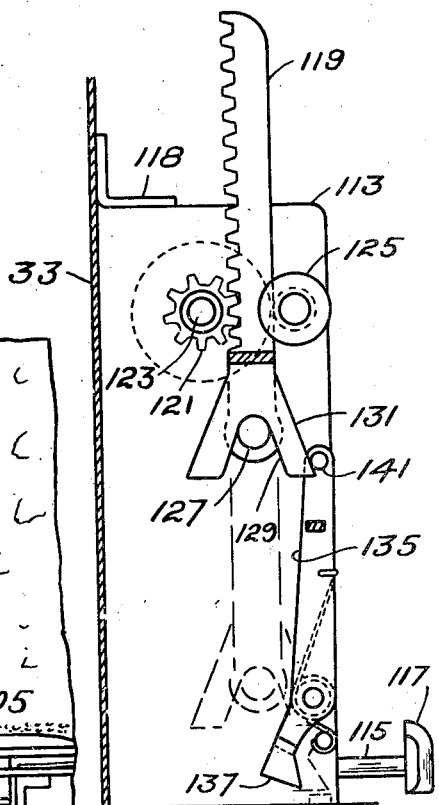
Figure 4:
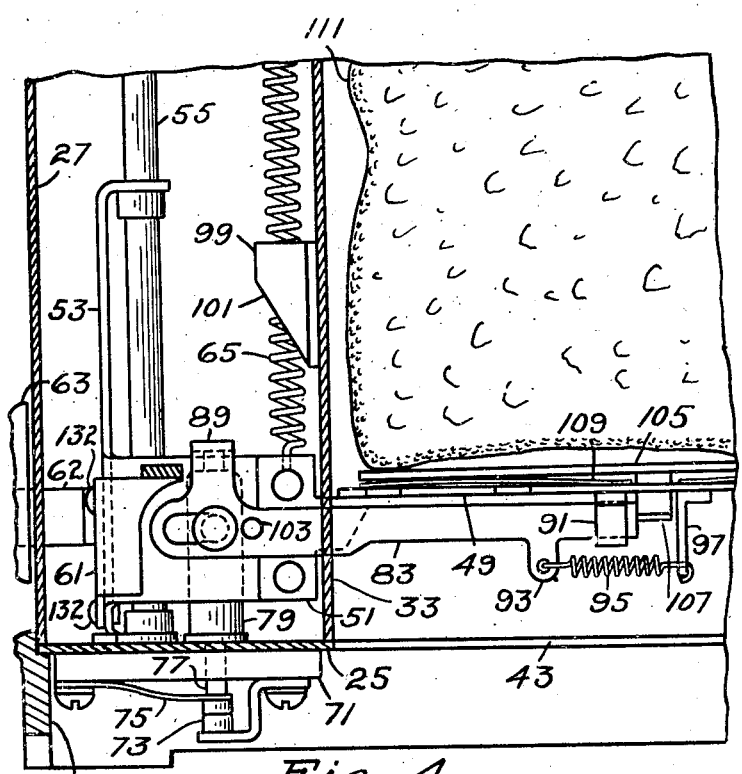

In the drawings,

Figure 1 is a side elevational view, on a reduced scale, of a toaster embodying my invention, Fig. 2 is a top plan view of the device shown in Fig. 1 and on substantially the same reduced scale, Fig. 3 is a fragmentary view partially in vertical section taken on the line 3—3 of Fig. 7, Fig. 4 is a fragmentary view showing a part only of the elements shown in Fig. 5 with the parts shown in positions occupied by them when a slice of bread is in toasting position, Fig. 5 is a view on the line 5—5 of Figs. 2 and 6, the parts being shown in non-toasting position, Fig. 6 is a horizontal sectional view taken on the line 6—6 of Fig. 5, Fig. 7 is a view in front elevation, with certain parts shown in section and taken on the line 7—7 of Fig. 5, Fig. 8 is a diagram of the electrical connections of the heating units and of the control switches, Fig. 9 is a fragmentary sectional view taken on the line 9—9 of Fig. 10, and, Fig. 10 is a fragmentary view similar to Fig. 5 but showing the parts in toasting position when no bread slice is in a given toasting compartment.

A multiple-slice toaster 21 includes a moulded composition frame 23 having secured thereto adjacent the upper face thereof a bottom or base plate 25 made of metal. The toaster 21 includes also a vertically extending casing 27 comprising two side walls, a front and a rear wall and a cover member 29 interfits therewith, all in a manner well known in the art.

I have elected to show a two-slice toaster, the structure including a rear intermediate wall 31, a front intermediate wall 33 and four planar vertically-extending heating elements 35. Each of the electric heating elements 35 includes one or more pieces of electric-insulating material 37, such as mica, having wound thereon in a manner well known in the art, a resistor conductor or strip 39. Each pair of spaced vertical heating elements 35 are adapted to have positioned therebetween a slice of bread and the space defined by the two spaced heating elements and parts of the front and rear intermediate walls are considered to constitute a toasting compartment. There will, therefore, be twice as many heating elements as there are toasting compartments. While I have shown two planar heating elements for each slice of bread to be toasted, I do not desire to be limited thereto since I may use a single heating element between adjacent slices so that the toaster will contain one more heating element than the maximum number of slices of bread which can be toasted simultaneously.

The lower ends of the respective vertically-extending heating elements may interfit with the bottom plate 25 while the upper edges of the respective heating elements may be held in proper operative spaced positions by longitudinally-extending top frame plates 41. The bottom plate 25 is provided with a number of apertures 43, the number of these apertures being the same as the number of toasting chambers as hereinbefore defined. The number of upper frame plates is the same as that of the number of toasting compartments and each of the frame plates is provided with an opening 45 therein, which opening registers with a similar opening 47 in the cover to permit of inserting slices of bread to be toasted and to remove pieces of toast. The lower apertures 43 cooperate with the upper apertures 45 and 47 to permit of ventilation of the toasting chambers.

Means for supporting slices of bread in the respective toasting chambers may include bread carriers 49 having rear end portions projecting through vertical slots in the rear intermediate wall 31 and having front end portions extending forwardly through vertical slots in the front intermediate wall 33. The front end portions of the plurality of bread carriers 49 may be secured to rearwardly-extending portions 51 of a carriage 53. This carriage is arranged to have vertical movement upwardly and downwardly on a pair of vertically-extending standards 55. The lower ends of these standards 55 may interfit with the bottom plate 25 while the upper end of these standards may interfit with forwardly-extending portions 57 of the frame plates 41 and a cross bar 59 may be provided to make the assembly more rigid. All of these details are already well known in the art and reference may be had to Ireland Patent No. 2,001,362 for a full and clear description thereof. Carriage 53 may have mounted thereon, in a manner to be hereinafter described, a bracket 61, which has secured thereto a forwardly-extending member 62, the front end of which extends forwardly of the front wall of casing 27 through a vertical slot and a knob 63 is mounted thereon in front of the front wall of the casing by means of which an operator may move the bread carriers in a given direction vertically on the standard.

It is desired to yieldingly bias the bread carriers into their upper position, shown for instance in Fig. 5 of the drawings, and a coil spring 65 has its lower end connected with a cross bar 67 which extends between the front ends of the carriers 49 and also between the rearwardly-extending portions 51 of the carriage. The upper end of coil spring 65 may be secured to a bracket 69 mounted on the front intermediate wall 33 adjacent its upper end. It is therefore evident that when an operator presses downwardly on knob 63 he will cause downward vertical movement of the plurality of bread carriers 49 and will also tension spring 65 which will therefore be effective under certain definite operating conditions to effect return of the bread carriers into the non-toasting position. It may be pointed out that Figs. 5 and 7 show the bread carriers in their non-toasting position while Figs. 4 and 10 show the bread carriers and associated parts in their toasting positions.

Since it is desired to selectively energize the heating elements associated with and constituting a part of the walls defining a toasting chamber, I provide a plurality of normally open circuit-controlling switches for the respective pairs of heating elements of the several toasting chambers. I may provide a block 71 of electric-insulating material secured against the bottom surface of bottom plate 25 and mount thereon a substantially fixed contact member 73. I provide further a spring contact arm 75 which is so designed and constructed that it is normally out of engagement with contact member 73. An actuating rod 77 has the greater part of its length encased in a tubular member 79 with a portion of the rod extending through an opening in bottom plate 25 and in member 71 so that it may engage spring contact arm 75 when moved downwardly by suitable means. A coil spring 81 is provided in the tubular member 79 and cooperates with a shoulder on rod 77 to yieldingly maintain it in its upper or raised position as shown for instance in Fig. 5 of the drawings. The connections between the pairs of heating elements 35 and the fixed and movable cooperating contact members is shown more particularly in Fig. 8 of the drawings.

Means for causing downward movement of rod 77 when the carriers are moved downwardly may comprise a bar 83 the forward end of which is located adjacent to the outside surface of one of the rearwardly projecting portions 51, a slot 85 extending longitudinally therein adjacent its front end and a headed pin 87 fitting into said slot to hold the bar 83 in its proper operative position adjacent the outside surface of member 51 and below the carrier 49. A laterally-extending projection 89 is provided on each of the bars 83 at a point above the upper edge of member 51 and extends inwardly laterally of the bar 83 and of the toaster, the design and construction being such that, under certain operating conditions, the outer end of projection 89 will engage the upper end of rod 77 just before the bread carrier has been moved to its lowermost position so that rod 77 will be forced downwardly to cause spring contact arm 75 to engage fixed contact 73 under these conditions.

The rear end of bar 83 extends through a suitable bearing member 91 secured against the bottom surface of the carrier 49 so that the rear end of the bar 83 is slidably supported. The bar 83 is provided also with a depending extension 93 having a small opening therein for receiving one end of a coil spring 95, the other end of which is connected to a bracket 97 secured to the carrier 49. The action of spring 95 is to bias the bar 83 to a position where it would be ineffective to cause closing of the circuit-controlling switch operatively associated therewith.

A bracket 99 of substantially L-shape has a cam surface 101 thereon which has its front edge extending angularly upwardly away from the front intermediate wall 33 against which it is mounted and by which it is supported. Bar 83 is provided with a laterally-extending pin 103 so positioned therein that it will be drawn by spring 95 against the straight front edge of bracket 99 when the carriers are in their non-toasting position, as shown for instance in Fig. 5 of the drawings. I provide as many brackets 99 as there are bread carriers.

Each of the bread carriers 49 is provided with a supplementary carrier plate 105 having a depending lug 107 secured thereto substantially centrally of its length. A pair of leaf springs 109 may have one end secured to the upper surface of a bread carrier 49 at substantially its mid-portion (see Fig. 5) the other ends of the springs 109 being bowed upwardly away from the carrier 49 to maintain the supplementary carrier 105 a slight distance above the bread carrier 49 substantially as shown in Fig. 5 of the drawings. Member 107 may be provided with an enlarged head at its lower surface to prevent disassociation of the supplementary carrier 105 from the main carrier 49 under the action of springs 109.

Let it be assumed that a slice of bread 111 is inserted through the top of the toaster assembly into a given toasting chamber. The design, construction and adjustment of the auxiliary or supplementary carriers 105 and the springs 109 associated therewith is such that the weight of a slice of bread will cause downward movement of supplementary carrier 105 relatively to the main carrier 49 on which it is positioned so that depending lug 107 will be moved into the position shown in Fig. 4 of the drawings where it will depend below the upper edge of bar 83 so that spring 95 will be ineffective to cause appreciable rear movement of bar 83 when the bread carriers are moved downwardly so that pin 103 will be moved out of engagement with the front edge of bracket 99. Fig. 4 of the drawings shows the positions of these members when a slice of bread 111 was placed upon a carrier when the carrier was in the non-toasting position shown in Fig. 5 of the drawings and an operator pressed downwardly on knob 63 to move the carriers downwardly into toasting position. It is evident that under these conditions, namely the presence of a slice of bread on a given carrier, the bar 83 cannot be moved backwardly and portion 89 thereof will be in position to engage and press downwardly actuating bar 77 to effect engagement of spring-contact arm 75 with fixed contact member 73, as shown in Fig. 4 of the drawings. It is further obvious that if no slice of bread is placed in one of the toasting chambers while the carrier in that chamber (as was the other carrier) is in its upper non-toasting position and an operator then presses down on the knob 63, bar 83 can be moved to the rear when permitted to do so by the disengagement of pin 103 from bracket 99 so that when the bread carriers are in their lower toasting position, portion 89 of bar 83 will not operatively engage actuating rod 77 to cause closure of the switch, so that the heating elements of all of the other toasting chambers which have received a slice of bread will be energized.

Timing means for determining the duration of a toasting operation may include a variable speed mechanical timer 113 which may be of the type disclosed and claimed in Ireland Patent No. 1,866,808. The timer structure may include a short shaft 115 extending outwardly through the front wall of the casing 27 and may have mounted thereon a knob 117 whereby turning movement of the knob will vary the speed of operation of the mechanical timer. It is to be noted that the timer 113 is positioned in what may be called the mechanism chamber in front of the front intermediate wall 33 and the front wall of casing 27 and may be held in proper operative position by a bracket 118.

The timer 113 is provided with a rack bar 119 meshing with a pinion 121 fixedly mounted on a spring arbor 123, a grooved roller 125 cooperating with the rack bar 119 to hold it in mesh with the pinion 121, all as set forth in Patent No. 1,866,808. The lower end of rack bar 119 is provided with a laterally projecting short pin 127 which pin is adapted to be engaged in a recess 129 of inverted V-shape provided in a vertically depending portion 131 connected to or integral with member 61. Member 61 is of generally L-shape (see Fig. 6) located in front of and along the right-hand portion 51. It is slidably mounted on carriage 53 by a plurality of headed rivets or studs 132, secured to member 61 and extending through vertical slots 133 in carriage 53. It is thus possible for member 61 to move vertically relatively to carriage 53. When carriage 53 is in the uppermost or non-toasting position, the studs 132 will be at the bottom of slots 133 and a downward movement of member 61 as by pressure on the knob 63, will cause downward movement of carriage 53. Portion 131 will of course also move downwardly and cause downward movement of the rack bar and winding of the timer.

The timer is further provided with a detent lever 135 pivotally mounted at one side of the timer structure adjacent to portion 131. The lever 135 is provided with a lower detent portion 137 adapted to engage with a projection 139 secured to and extending substantially horizontally of the carriage 53 whereby carriage 53 and the carriers secured thereto will be held in their lowermost or toasting position when they have been moved thereinto. It is obvious that the timer is wound substantially simultaneously with the movement of the carriers into their toasting position and with the engagement of member 139 with the lower end portion 137 of the detent lever. In the lowermost or toasting position of carriage 53, member 61 is free to move upwardly independently of carriage 53, studs 132 moving freely in slots 133, this movement of member 61 being produced by the unwinding of the timer, which causes an upward movement of rack bar 119 and of portion 131.

The form of member 131 is of substantially inverted V-shape as will be seen by reference to Fig. 3 and one of the inclined faces thereof is adapted to engage with the pin 141 secured to the upper end of lever arm 135 whereby turning movement of the lever arm in a clockwise direction will be effected whereby engagement of member 139 with the detent lever is terminated so that spring 65 may cause quick upward movement of the carriage 53 and of the toasted slices of bread on the carriers.

It will be obvious that the device embodying my invention provides relatively simple and rugged means for ensuring that the amount of electric energy translated into heat in a multiple-slice toaster will vary directly in accordance with the number of slices of bread which are simultaneously moved into toasting position in a corresponding plurality of toasting chambers at the same time that a timing means is energized which will cause termination of the toasting operation at the end of a time depending upon the adjustment of the variable speed mechanical timing means. It is to be understood that while I have illustrated and described a mechanical timer, that my invention is not limited to the use of such a timer but that any other kind of timer, such as for instance a thermal timer of the kind disclosed and claimed in Graham Patent No. 2,180,233, may be used instead.

The device embodying my invention provides an automatic toaster which comprises bread slice controlled means for ensuring that the heating elements of only those compartments in which the carriers have a slice of bread located thereon are energized, all others being deenergized, so that the amount of electric energy translated into heat in a toaster of this kind varies with and is directly proportional to the number of slices of bread being toasted at the same time.

While I have illustrated and described a structure embodying my invention which is preferred by me at the present time, I do not desire to be limited thereto since it is obvious that modifications may be made therein without departing from the spirit and scope of the invention and I therefore desire that all such modifications shall be considered to be covered by the appended claims.

I claim as my invention:

1. A toaster comprising a toast heating element, a bread carrier movable relatively to the heating element into toasting and non-toasting positions, means to bias the carrier to non-toasting position and means to move the carrier to toasting position, the improvement comprising a control switch for said toast heating element, a switch-closing member supported by the carrier and movable relatively thereto into switch closing and non-switch-closing positions, means tending to move said switch-closing member into switch-closing position relatively to the carrier when the carrier is in non-toasting position and means for holding said switch-closing member in position to cause closing of the switch when the carrier is in toasting position and when a slice of bread is on said carrier.

2. An automatic electric toaster comprising a plurality of toasting chambers, electric heating elements for each chamber, a bread carrier in each chamber movable into toasting and non-toasting positions therein relatively to said heating elements, means to move said bread carriers simultaneously into toasting positions in the respective toasting chambers, a plurality of normally open switches for the electric heating elements, a switch-closing member on each carrier and movable relatively thereto into switch-closing and non-switch-closing position, spring means on the carrier for biasing the switch-closing member into non-switch-closing position relatively to its carrier, means fixedly carried by the toaster to move the switch-closing member into switch-closing position relatively to its carrier when the latter is in non-toasting position and means on the carrier movable by the weight of a slice of bread placed on the carrier for retaining said switch-closing member in switch-closing position on its carrier when the latter is moved into toasting position.

3. An automatic electric toaster comprising a plurality of toasting chambers, electric heating elements for each chamber, a bread carrier in each chamber movable into toasting and non-toasting positions therein relatively to said heating elements, means to move said bread carriers simultaneously into toasting positions in the respective toasting chambers, a plurality of normally open switches for the electric heating elements, a switch-closing member on each carrier and movable relatively thereto into switch-closing and non-switch-closing position, spring means on the carrier for biasing the switch-closing member into non-switch-closing position relatively to its carrier, means on the carrier actuable by the weight of a slice of bread placed on the carrier for preventing movement of the switch-closing member on its carrier by said spring means into non-switch-closing position relatively to its carrier and means including a fixed cam surface operatively engaging said switch-closing member when its carrier is in non-toasting position for moving the switch-closing member into switch-closing position relatively to its carrier.

4. An automatic electric toaster comprising a toasting chamber, toast heating elements for the chamber, a normally open control switch for the toast heating elements, a bread carrier in the toasting chamber movable into fixed toasting and non-toasting positions therein and normally yieldingly biased into non-toasting position, a switch-closing bar slidably mounted on the carrier, means normally yieldingly biasing said switch-closing bar into non-switch-closing position, means on the toaster mechanically engaging the switch-closing bar when the carrier is in non-toasting position to move and hold said bar in switch-closing position, a lug on the carrier normally yieldingly biased out of the path of movement of said bar and adapted to be moved into said path of movement by the weight of a slice of bread on the carrier to hold said bar in switch-closing position when the carrier is moved into toasting position.

DANIEL J. McCARTHY.